United States Patent
Friesen et al.

(10) Patent No.: US 9,214,708 B2
(45) Date of Patent: Dec. 15, 2015

(54) GAS VENT FOR ELECTROCHEMICAL CELL

(75) Inventors: Cody A Friesen, Fort McDowell, AZ (US); Ramkumar Krishnan, Scottsdale, AZ (US); Grant Friesen, Scottsdale, AZ (US); Todd Trimble, Phoenix, AZ (US); Michael Mihalka, Sun City, AZ (US); Andrew Goodfellow, Phoenix, AZ (US)

(73) Assignee: FLUIDIC, INC., Scottsdale, AZ (US)

( * ) Notice: Subject to any disclaimer, the term of this patent is extended or adjusted under 35 U.S.C. 154(b) by 7 days.

(21) Appl. No.: 13/566,948

(22) Filed: Aug. 3, 2012

(65) Prior Publication Data

US 2013/0095393 A1  Apr. 18, 2013

Related U.S. Application Data

(60) Provisional application No. 61/515,749, filed on Aug. 5, 2011.

(51) Int. Cl.
*H01M 12/06* (2006.01)
*H01M 2/12* (2006.01)
*H01M 8/22* (2006.01)

(52) U.S. Cl.
CPC ............ *H01M 12/06* (2013.01); *H01M 2/1264* (2013.01); *H01M 8/225* (2013.01)

(58) Field of Classification Search
None
See application file for complete search history.

(56) References Cited

U.S. PATENT DOCUMENTS

| | | | |
|---|---|---|---|
| 6,127,061 A * | 10/2000 | Shun et al. .................. | 429/406 |
| 8,168,337 B2 | 5/2012 | Friesen et al. | |
| 8,309,259 B2 | 11/2012 | Friesen et al. | |
| 2009/0284229 A1 * | 11/2009 | Friesen et al. ............... | 320/137 |
| 2010/0119895 A1 | 5/2010 | Friesen | |
| 2010/0285375 A1 | 11/2010 | Friesen et al. | |
| 2010/0316935 A1 | 12/2010 | Friesen et al. | |
| 2011/0070506 A1 | 3/2011 | Friesen et al. | |
| 2011/0200893 A1 | 8/2011 | Friesen et al. | |
| 2011/0250512 A1 | 10/2011 | Friesen et al. | |
| 2011/0316485 A1 | 12/2011 | Krishnan et al. | |
| 2012/0015264 A1 | 1/2012 | Friesen et al. | |
| 2012/0068667 A1 | 3/2012 | Friesen et al. | |
| 2012/0139496 A1 | 6/2012 | Krishnan et al. | |
| 2012/0202127 A1 | 8/2012 | Friesen et al. | |

* cited by examiner

*Primary Examiner* — Patrick Ryan
*Assistant Examiner* — Haixia Zhang
(74) *Attorney, Agent, or Firm* — Pillsbury Winthrop Shaw Pittman, LLP

(57) ABSTRACT

An electrochemical cell system is configured to utilize an ionically conductive medium flowing through a plurality of electrochemical cells. One or more gas vents are provided along a flow path for the ionically conductive medium, so as to permit gasses that evolve in the ionically conductive medium during charging or discharging to vent outside the cell system, while constraining the ionically conductive medium within the flow path of the electrochemical cell system.

15 Claims, 10 Drawing Sheets

GAS VENT FOR ELECTROCHEMICAL CELL

The present application claims priority to U.S. Provisional Application Ser. No. 61/515,749, filed on Aug. 5, 2011, the entirety of which is hereby incorporated by reference.

FIELD

The present invention is generally related to an electrochemical cell system, and more particularly to an electrochemical cell system utilizing a liquid electrolyte.

BACKGROUND

Many types of electrochemical cells utilize a liquid electrolyte to support electrochemical reactions within the cell. For example, a metal-air electrochemical cell system may comprise a plurality of cells, each having a fuel electrode serving as an anode at which metal fuel is oxidized, and an air breathing cathode at which gaseous oxygen from ambient air is reduced. Such a cell may also comprise an electrolyte to communicate the oxidized/reduced ions between the electrodes. For example, see U.S. Patent Publication No. 2009/0284229, incorporated in its entirety herein by reference. In some electrochemical cell systems comprising a plurality of electrochemical cells, the electrolyte may be shared by multiple cells. For example, the electrolyte may flow in series from one cell to another, such as is described in U.S. patent application Ser. No. 12/631,484, incorporated herein in its entirety by reference. In other electrochemical cell systems, the electrolyte may be shared by multiple cells, but may flow partially in parallel.

In some electrochemical cell systems, various gasses may evolve during the charging and/or discharging of the cell. Such gasses may be harmful to the cell, and may damage or impede performance of the cell. For example, in some cases the cell may be harmed due to the evolved gasses increasing pressure within a confined area in the cell. In some cases, the cell (and potentially its surroundings) may be harmed due to the evolution of a potentially volatile gas or combination of gasses. Some electrochemical cells are configured to disperse such gasses by including vents therein, so that gasses may escape into the ambient environment. Other electrochemical cells may be configured with pressure relief valves, which are typically closed, however open when the pressure within the cell exceeds a threshold amount.

Among other improvements, the present application also endeavors to provide an effective and improved way of controlling the discharge of gasses within the cell, without adversely affecting the flow of liquid electrolytes within the cell and/or the performance of the cell during operation.

SUMMARY

According to an embodiment, an electrochemical cell system includes one or more electrochemical cells, each comprising (i) a fuel electrode comprising a metal fuel; and (ii) an oxidant electrode spaced from the fuel electrode. The electrochemical cell system also includes a liquid ionically conductive medium for conducting ions between the fuel and oxidant electrodes to support electrochemical reactions at the fuel and oxidant electrodes, and a housing configured to contain the ionically conductive medium in the one or more electrochemical cells. The electrochemical cell system further includes a gas permeable and liquid impermeable membrane positioned along a portion of the housing and configured to close the portion of the housing to contain the ionically conductive medium therein but permit gas in the housing to permeate therethrough for venting of the gas from the one or more electrochemical cells. The fuel electrode and the oxidant electrode are configured to, during discharge, oxidize the metal fuel at the fuel electrode and reduce an oxidant at the oxidant electrode to generate a discharge potential difference therebetween for application to a load.

According to another embodiment, a method for assembling an electrochemical cell system includes providing a cell module configured to receive a liquid ionically conductive medium therein, and installing a fuel electrode configured to store a metal fuel therein into a cell chamber of the cell module. The method additionally includes providing a plate for the cell module, and installing an oxidant electrode and a gas permeable and liquid impermeable membrane on the plate. The method further includes joining the plate and the cell module such that the ionically conductive medium is prevented from permeating therebetween, and the oxidant electrode is spaced from the fuel electrode. The fuel electrode and the oxidant electrode are configured to, during discharge, oxidize the metal fuel at the fuel electrode and reduce an oxidant at the oxidant electrode to generate a discharge potential difference therebetween for application to a load. Additionally, the gas permeable and liquid impermeable membrane is positioned along a portion of the cell module and configured to close the portion of the cell module to contain the ionically conductive medium therein but permit gas in the cell module to permeate therethrough for venting of the gas from the electrochemical cell system.

According to another embodiment, an electrochemical cell system includes a housing and one or more electrochemical cells positioned within the housing. Each of the one or more electrochemical cells includes (i) a fuel electrode comprising a metal fuel; and (ii) an oxidant electrode spaced from the fuel electrode. The electrochemical cell system additionally includes a gas permeable and liquid impermeable membrane positioned to define a portion of a surface of the housing, and a liquid ionically conductive medium, within the housing, for conducting ions between the fuel and oxidant electrodes to support electrochemical reactions at the fuel and oxidant electrodes. The fuel electrode and the oxidant electrode are configured to, during discharge, oxidize the metal fuel at the fuel electrode and reduce an oxidant at the oxidant electrode to generate a discharge potential difference therebetween for application to a load. Additionally, the gas permeable and liquid impermeable membrane is configured to prevent permeation of the ionically conductive medium out of the housing, but permit gas in the housing to permeate therethrough for venting of the gas from the one or more electrochemical cells.

According to another embodiment, an oxidant electrode and vent assembly for an electrochemical cell comprises a gas permeable and liquid impermeable membrane, and one or more oxidant electrode active materials provided on a first portion of the gas permeable and liquid impermeable membrane, but not a second portion of the gas permeable and liquid impermeable membrane. When the oxidant electrode and vent assembly is mounted to an electrochemical cell comprising a fuel electrode and a liquid ionically conductive medium such that the liquid ionically conductive medium contacts the one or more oxidant electrode active materials and the fuel electrode, the fuel electrode and the one or more oxidant electrode active materials are configured to, during discharge, oxidize the metal fuel at the fuel electrode and reduce a gaseous oxidant received through the gas-permeable and liquid impermeable membrane at the one or more oxidant electrode active materials, to generate a discharge potential difference therebetween for application to a load. Additionally, at least the first portion of the gas permeable and liquid impermeable membrane is configured to prevent permeation of the ionically conductive medium out of the electrochemical cell and permit the gaseous oxidant to permeate into the one or more oxidant electrode active materials. Furthermore, at least the second portion of the gas permeable and liquid impermeable membrane is configured to permit gas in the electrochemical cell to permeate therethrough for venting of the gas from the electrochemical cell, and prevent permeation of the ionically conductive medium out of the electrochemical cell.

Other aspects of the present invention will become apparent from the following detailed description, the accompanying drawings, and the appended claims.

BRIEF DESCRIPTION OF THE DRAWINGS

Embodiments of the invention will now be described, by way of example only, with reference to the accompanying schematic drawings in which corresponding reference symbols indicate corresponding parts, and in which.

DETAILED DESCRIPTION

Figure 1:
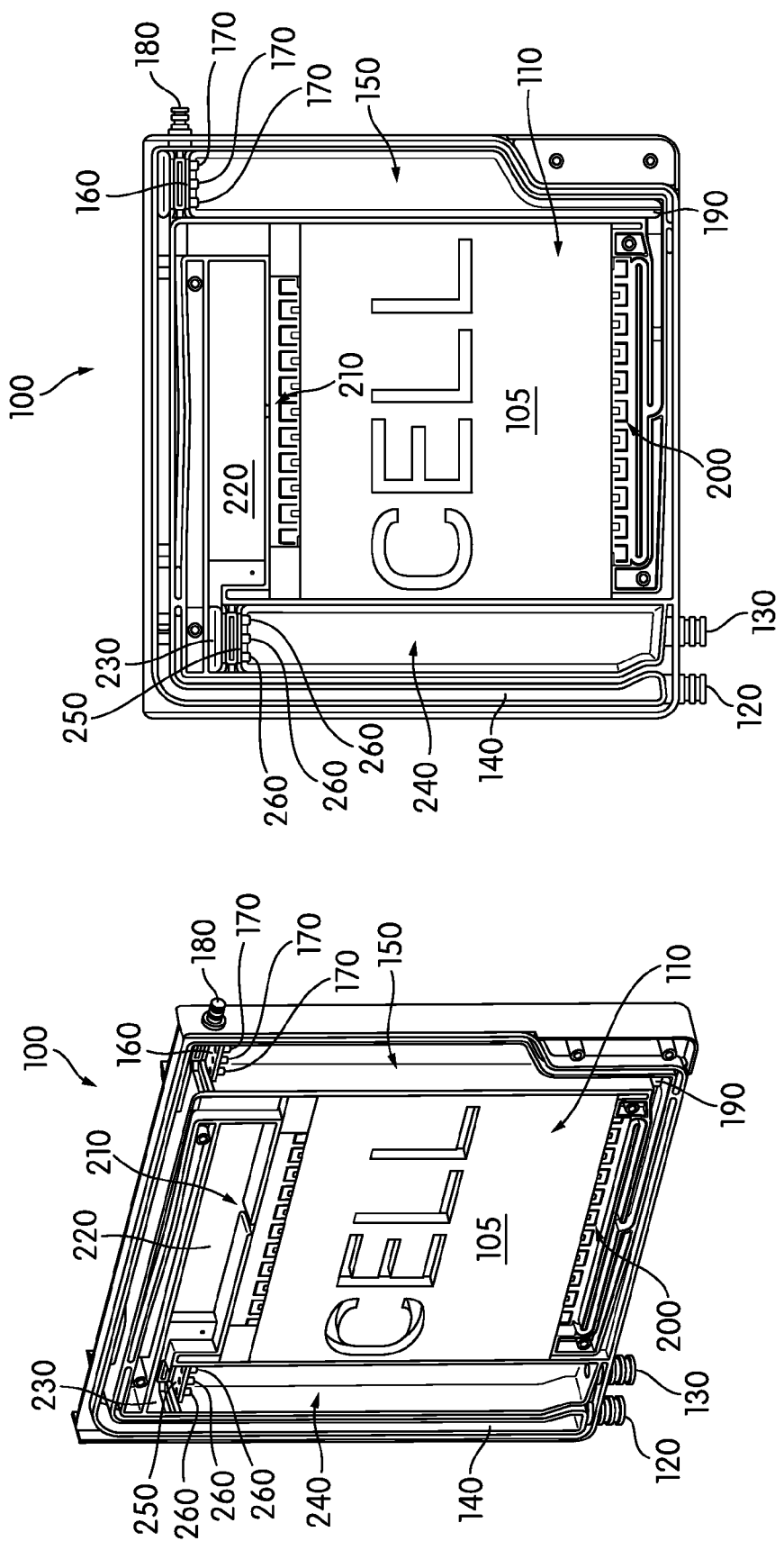
FIG. 1 illustrates side and perspective views of a cell module configured to house an electrochemical cell, and define a flow path for an ionically conductive medium utilized by the electrochemical cell.

FIG. 1 illustrates perspective and side views of an electrochemical cell module 100, configured to house one or more cells 105 at least partially in a cell chamber 110. The cells 105, described in greater detail below, are configured to utilize an ionically conductive medium that flows through or is otherwise contained in and/or constrained by portions of the cell module 100, to conduct ions therein. The ionically conductive medium will also be described in greater detail below. While in some embodiments the ionically conductive medium may be generally stationary within the cell module 100, such as in a pool or other quantity of ionically conductive medium, in other embodiments such as those illustrated herein, the ionically conductive medium may be configured to flow into, through, and out of the electrochemical cell module 100. In some embodiments, the ionically conductive medium may be stored in a reservoir R (not shown), and a flow pump FP (also not shown) may be used to pump the ionically conductive medium through one or more cell modules 100. In embodiments wherein the ionically conductive medium is flowing through the one or more cell modules 100, the rate of flow may vary in different embodiments. For example, in some embodiments, a constant flow of ionically conductive medium may be maintained, while in other embodiments the ionically conductive medium may be pulsed periodically through the cell. In some embodiments, sensors may be associated with the cell, and may provide signals (including but not limited to an indication of the passage of time, or an indication of a reduction of cell performance), which may prompt the flow pump FP to flow or pulse the ionically conductive medium. As illustrated, the cell module 100 may have at least one cell inlet 120, configured to permit the ionically conductive medium to enter the cell module 100, and at least one cell outlet 130 configured to permit the ionically conductive medium to leave the cell module 100. More details of the electrochemical cell module 100 and each cell 105 will be discussed below.

As the ionically conductive medium is electrically conductive, the flow of ionically conductive medium through multiple cells 105 may cause shunt current, the parasitic or counter-productive current that flows through the ionically conductive medium between electrodes of different cells 105 housed in adjacent cell modules 100, reducing an overall potential difference across the cell modules 100. Physical separation of the ionically conductive medium may serve to disrupt the shunt current, by breaking the counter-productive electrical connections formed in the ionically conductive medium, creating at least some current isolation. To physically separate the ionically conductive medium across multiple cell modules 100, each cell module 100 may include one or more flow dispersers, such as those described in U.S. patent application Ser. No. 13/362,775, incorporated herein in its entirety by reference.

In the illustrated embodiment, once the ionically conductive medium enters cell inlet 120, it flows along inlet channel 140 towards an inlet disperser chamber 150. As shown, inlet channel 140 may travel upwards (i.e. against the force of gravity) so that gravity can assist in the dispersal of the ionically conductive medium in the inlet disperser chamber 150. In the illustrated embodiment, the inlet disperser chamber 150 contains a flow disperser 160 configured to break up the flow of the ionically conductive medium by passing it through one or more nozzles 170. In an embodiment, flow disperser 160 will be positioned at a terminal end of inlet channel 140 so that the ionically conductive medium will fall downward through the one or more nozzles 170, and, in a dispersed form through the remainder of inlet disperser chamber 150. By dispersing the ionically conductive medium, any electrical current, such as shunt current, that could otherwise flow through the ionically conductive medium would be broken, preventing or minimizing the influence of such currents between fluidically connected cell modules 100.

In various embodiments, the inlet disperser chamber 150 may vary in terms of the shape, size, number, and configuration of the one or more nozzles 170. In some embodiments, the size, shape, and number of nozzles 170 in inlet disperser 160 may be determined by a flow rate of the ionically conductive medium through the cell housing 100. As shown in the illustrated embodiment, in some embodiments an air inlet 180 may be provided to permit a flow of air into inlet disperser chamber 150. In some embodiments inlet disperser 160 may contain an air nozzle that is connected to air inlet 180, while in other embodiments air inlet 180 may lead directly into a post-dispersal portion of the inlet disperser chamber 150. In an embodiment, the air inlet 180 may create a pressurized amount of air in the inlet disperser chamber 150, such that a pressure head is maintained to drive the ionically conductive medium through the cell module 100, despite the passage through inlet disperser chamber 150. In some embodiments wherein the ionically conductive medium may have a tendency to foam or bubble after dispersion, such air pressure may also be useful in suppressing such action, so that the foamed or bubbled ionically conductive medium does not collapse the air pocket formed in the inlet dispersion chamber, creating an electrical connection through the foam or bubbling when the foamed or bubbled ionically conductive medium grows to contact the ionically conductive medium in the one or more nozzles 170.

Once the ionically conductive medium falls in dispersed form through the inlet disperser chamber 150, it may gather at a bottom of a chamber, and flow into a pre-cell channel 190. As shown, the pre-cell channel 190 may be configured such that the ionically conductive medium may flow through the cell 105 in the cell chamber 110. Again, the cell 105 is described in greater detail below. In the illustrated embodiment, cell module 100 may be configured to divide the flow of the ionically conductive medium into a plurality of flow lanes across the electrodes of the cell 105. In the illustrated embodiment, a pre-cell manifold 200 may be positioned at the end of the pre-cell channel 190, and configured to split the flow of the ionically conductive medium along the flow lanes, which may be formed in the electrodes of the cell 105, as discussed in greater detail below. At the opposite end of the cell chamber 110, a post-cell manifold 210 may be positioned to receive the flow from the plurality of flow lanes, and recombine the flows. In the illustrated embodiment, the ionically conductive medium flows upward (i.e. against the force of gravity) across the cell chamber 110, and may be pushed by the pressure head maintained within the cell module 100.

As is shown in the illustrated embodiment, the recombined flows of ionically conductive medium may flow into a post-cell chamber 220, discussed in greater detail below, which may then lead to a post-cell channel 230. The post-cell channel 230 may be positioned to allow the ionically conductive medium to flow from the post-cell chamber 220, through the post-cell channel 230, and fall under the force of gravity through an outlet disperser chamber 240. As shown, outlet disperser chamber 240 may contain an outlet disperser 250, which again may contain one or more nozzles 260. In some embodiments, outlet disperser 250 may be of a similar construction and configuration as inlet disperser 160. In other embodiments, outlet disperser 250 may differ from inlet disperser 160. For example, in embodiments, where the inlet disperser 160 contains an air nozzle to connect to air inlet 180, outlet disperser 250 may lack such an air nozzle. In some embodiments, this may be acceptable, as the outlet disperser chamber 240 may be connected to the reservoir R via the cell outlet 130, and thus there would be no need to maintain the pressure head following nozzles 260, nor would the ionically conductive medium generally foam, bubble, or otherwise back up within the outlet disperser chamber 240. In the illustrated embodiment, ionically conductive medium that is dispersed by outlet disperser 250 falls in dispersed form (i.e. discrete droplets) through the remainder of the outlet disperser chamber 240, and flows out the cell outlet 130.

The cell module 100 may be of any suitable structure or composition, including but not limited to being formed from plastic, metal, resin, or combinations thereof. Accordingly the cell module 100 may be assembled in any manner, including being formed from a plurality of elements, being integrally molded, or so on. In various embodiments the cell module 100, the cells 105, and/or appurtenant structures and assemblies may include elements or arrangements from one or more of U.S. patent application Ser. Nos. 12/385,217, 12/385,489, 12/549,617, 12/631,484, 12/776,962, 12/885,268, 13/028,496, 13/083,929, 13/167,930, 13/185,658, 13/230,549, 13/299,167, 13/531,962, 13/532,374, and 61/556,011, each of which are incorporated herein in their entireties by reference. The flow path of the ionically conductive medium through the cell module 100 may differ in various embodiments, and the illustrated embodiment of FIG. 1 is merely exemplary, and is not intended to be limiting in any way.

Figure 2:
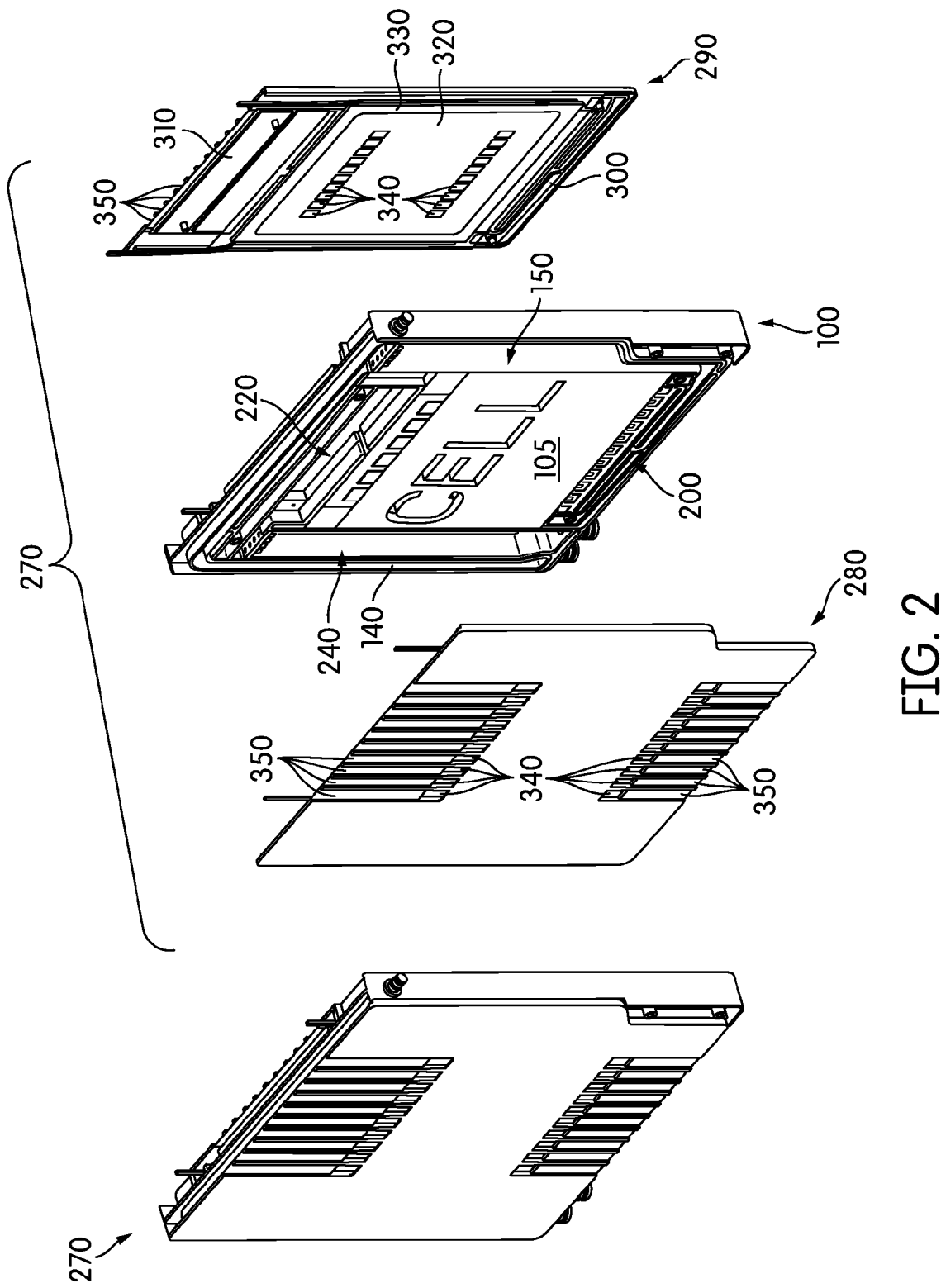
FIG. 2 illustrates perspective and exploded views of a cell assembly including the cell module of FIG. 1, further comprising covering plates configured to contain the flow of the ionically conductive medium within the cell module of FIG. 1, and to permit air access to one or more air cathodes of the one or more electrochemical cells.

Shown in FIG. 2 are perspective and exploded views of a cell assembly 270. As shown in the exploded view, the cell assembly 270 includes the cell module 100, enclosed by frontside plate 280 and backside plate 290. In an embodiment, the faces of frontside plate 280 and backside plate 290 that are configured to be directed towards the cell module 100 may be shaped and configured to match contours of the cell module 100, so as to assist in forming seals around the flow path defined in the cell module 100, and confine the ionically conductive medium to the flow path of the cell assembly 270. For example, in an embodiment, backside plate 290 forms a portion of the flowpath backside wall. As shown in the illustrated embodiment, backside plate 290 includes pre-cell manifold backwall 300, which would back onto pre-cell manifold 200 of the cell module 100, to partially enclose the flow path through the pre-cell manifold 200. A corresponding pre-cell manifold frontwall (not shown) would correspondingly be positioned on the frontside plate 280, such that the ionically conductive medium would be prevented from flowing out either the front or back faces of the pre-cell manifold 200, but instead would flow through the cell assembly 270 from the pre-cell channel 190 to the cell chamber 110.

In embodiments where frontside plate 280 and backside plate 290 are shaped to enclose the entirety of the flow path in cell module 100, the front and back faces of cell chamber 110, inlet disperser chamber 150, outlet disperser chamber 240, and the interconnecting portions of the flow path to and from these elements would all be sealed by frontside plate 280 and backside plate 290. In other embodiments, however, frontside plate 280 and backside plate 290 may be configured to enclose less than the entirety of the flow path in cell module 100. For example, in the embodiment illustrated in FIG. 2, while the frontside plate 280 is sized to enclose the entire front side of cell module 100, including the front faces of cell chamber 110, inlet disperser chamber 150 outlet disperser chamber 240, and the interconnecting flow path, the backside plate 290 is shown to be smaller. As shown, instead of backside plate 290 enclosing the backside of inlet disperser chamber 150, the backside of outlet disperser chamber 240, or the backsides of some of the associated portions of the flow path surrounding them, the backside of cell module 100 provides the back side of these elements. This may create a U-shaped or open-box cross section for the inlet disperser chamber 150, the outlet disperser chamber 240, and the backsides of associated portions of the flow path surrounding them. In such an embodiment, the securing of frontside plate 280 to cell module 100 would enclose the flow path in at least these areas (i.e. closing the open side of U-shape on the cross section) permitting a smaller backside plate 290. The smaller backside plate 290 could be shaped to enclose only those areas where access to the back face of cell module 100 would be desirable. For example, it may be desirable to access the back face of cell chamber 110, so as to provide access to the opposing side of the cell 105. Such a configuration may be useful, for example, where there are two cells 105 located within cell chamber 110, or where a single fuel electrode is shared by a pair of opposing oxidant electrodes, as discussed in greater detail below.

In some embodiments, a sealing material may be applied between the cell module 100 and the frontside plate 280 and/or the backside plate 290, to ensure liquid impermeability and prevent leakage. In various embodiments, the sealing material for the frontside plate 280 and backside plate 290 may comprise or include plastic or rubber gaskets, adhesives, or other sealants, including but not limited to solvent-bond sealants, single or two-part (i.e. base and accelerator) epoxies, or UV/thermally cured epoxies. In various embodiments, the sealants may comprise ABS glue weld-on 4707, MEK (methyl ethyl ketone), or have sealant properties similar to those marketed as Eager Polymer EP5347 epoxy and/or MagnaTac M777 epoxy, to prevent the undesirable loss of ionically conductive medium or flow pressure at the site where these elements join. In an embodiment, the sealing material may be non-conductive and electrochemically inert, to prevent interference with the electrochemical reactions of the cell 105.

As is further shown in the illustrated embodiment, the backside plate 290 may include a post-cell chamber backwall space 310, which may coordinate with a corresponding post-cell chamber frontwall space (not shown) on frontside plate 280, to define boundaries for post-cell chamber 220, as discussed below. Backside plate 290 may additionally include a backwall 320 configured to close the backside of cell chamber 110 of cell module 100. In the illustrated embodiment, backside plate 290 may be configured to receive an oxidant electrode, mounted to lip 330, to provide an oxidizer for electrochemical reactions in the cell 105. The oxidant electrode may be liquid impermeable, and thus would fluidly seal the ionically conductive medium to the flow path from the backside of cell chamber 110. Frontside plate 280 may include a similar structure to surround the frontside of cell chamber 110. The lip 330, in cooperation with a plurality of air apertures 340, and associated air channels 350 on each of frontside plate 280 and backside plate 290 permit a spacing between the oxidant electrode mounted to the lip 330, such that air may flow into the aperture 340 to provide oxygen from the air to the oxidant electrode. The air channels 350 may be recessed into the frontside plate 280 and the backside plate 290, as shown, such that when a plurality of cell assemblies 270 are aligned together, as shown in FIG. 3, the combined air channels 350 permit the flow of air between each pair of cell assemblies 270.

Although in some embodiments the oxidizer may be delivered to the oxidant electrode by a passive system (such as through the air channels 350), which may be sufficient to allow diffusion or permeation of oxygen from the air into the oxidant electrode, in other embodiments different sources of the oxidizer or mechanisms for bringing the oxidizer to the oxidant electrode may be utilized. For example, in an embodiment, a pump such as an air pump AP may be used to deliver the oxidizer to the oxidant electrode under pressure. The air pump AP may be of any suitable construction or configuration, including but not limited to being a fan or other air movement device configured to produce a constant or pulsed flow of air or other oxidant. The oxidizer source may be a contained source of oxidizer. In an embodiment, oxygen may be recycled from the electrochemical cell module 100, such as is disclosed in U.S. patent application Ser. No. 12/549,617, incorporated in its entirety above by reference. Likewise, when the oxidizer is gaseous oxygen from ambient air, the oxidizer source may be broadly regarded as the delivery mechanism, whether it is passive or active (e.g., pumps, blowers, etc.), by which the air is permitted to flow to the oxidant electrode. Thus, the term "oxidizer source" is intended to encompass both contained oxidizers and/or arrangements for passively or actively delivering oxygen from ambient air to the oxidant electrode.

Figure 3:
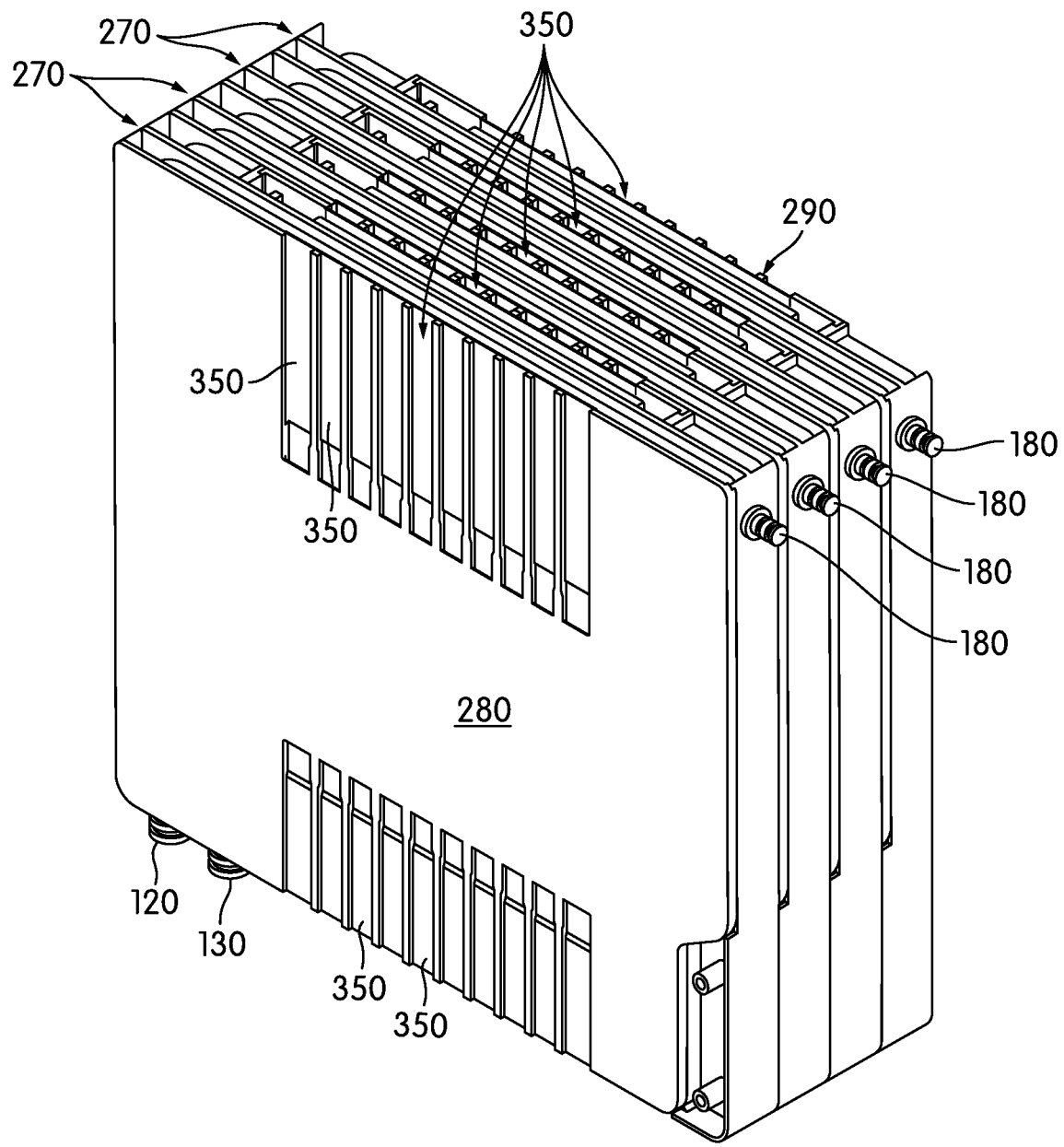
FIG. 3 illustrates an assembly of a plurality of the cell assemblies of FIG. 3, arranged such that air may reach the one or more air cathodes through the covering plates.

As may further be appreciated from FIG. 3, in some embodiments where the cell inlet 120 and the cell outlet 130 are proximal to one another in each of the cell modules 100, a number of configurations for the flow of the ionically conductive medium may be easily permitted. For example, in some embodiments, all of the cell inlets 120 may be coupled together by a manifold, and all of the cell outlets 130 may be coupled together by a manifold, such that the ionically conductive medium flows through the cell assemblies 270 in parallel. In another embodiment, the intermediate cell outlets 130 may be coupled to the adjacent cell inlet 120, such that the ionically conductive medium flows through all cell assemblies 270 in series. Also as shown, each of the air inlets 180 may be adjacent to one another when the cell assemblies 270 are aligned, which may ease the coupling of air inlet tubing for such embodiments. In various embodiments, an air inlet manifold may couple all air inlets 180 to a single tube that is coupled to an air pump AP, while in other embodiments separate tubes may all couple to one or more air pumps AP.

Figure 4:
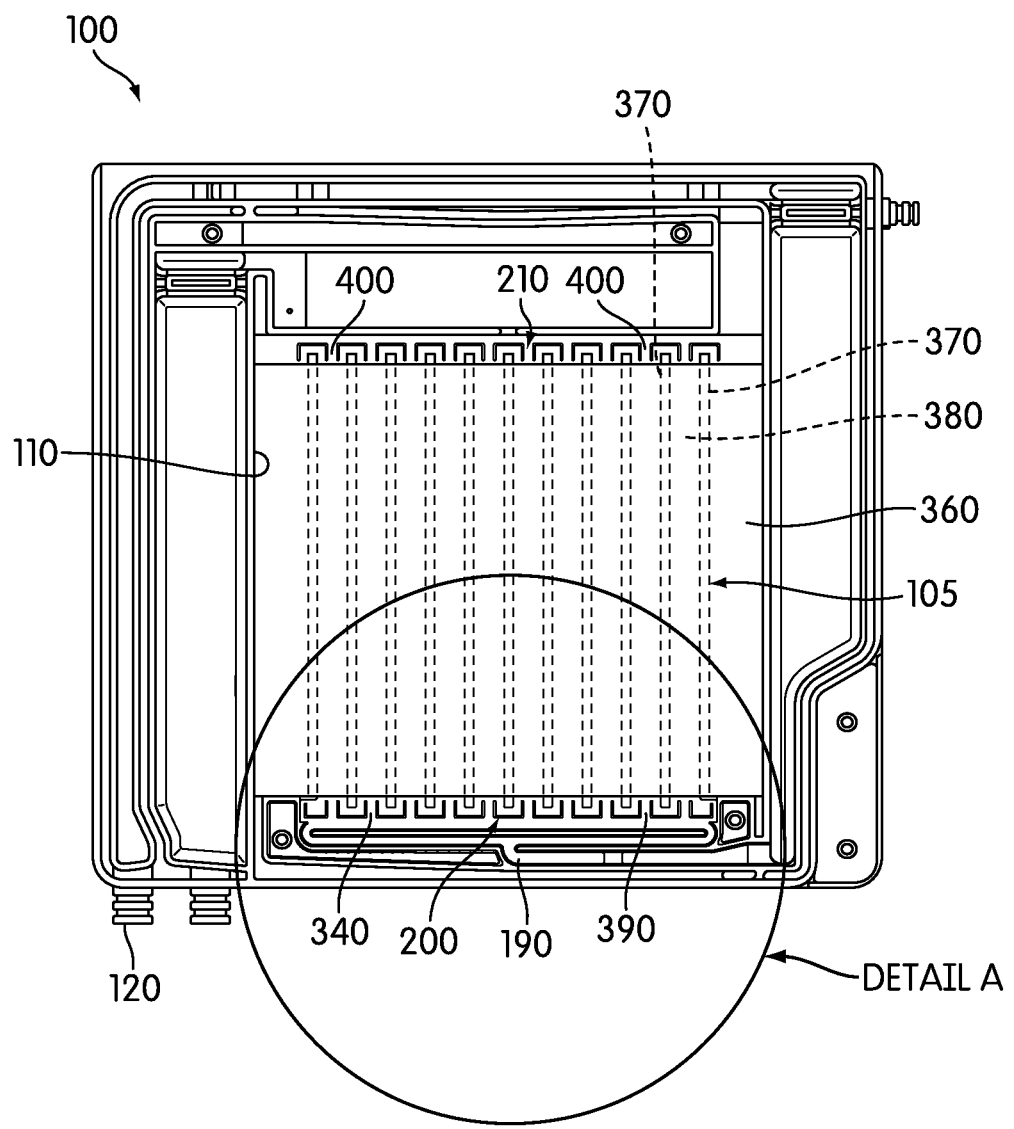
FIG. 4 illustrates a side view of the cell module of FIG. 1, with flow manifolds therein to direct the flow through flow lanes associated with the one or more electrochemical cells assembled in the housing.
Figure 5:
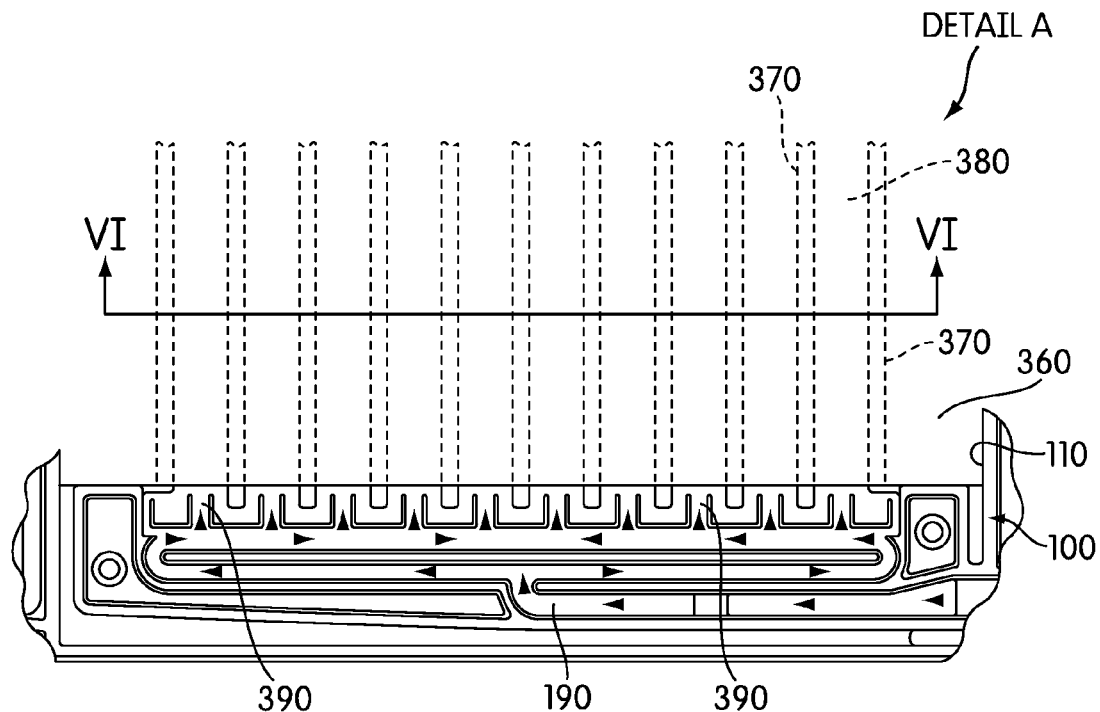
FIG. 5 illustrates a detailed view from FIG. 4, enlarging one of the flow manifolds and depicting the flow lanes connecting thereto within a fuel electrode.
Figure 6:
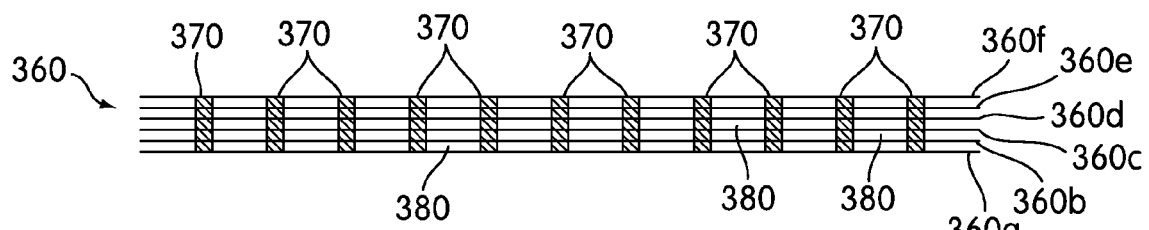
FIG. 6 illustrates a cross sectional view of the fuel electrode of FIG. 5, showing the flow lanes defined by spacers therein.
Figure 7:
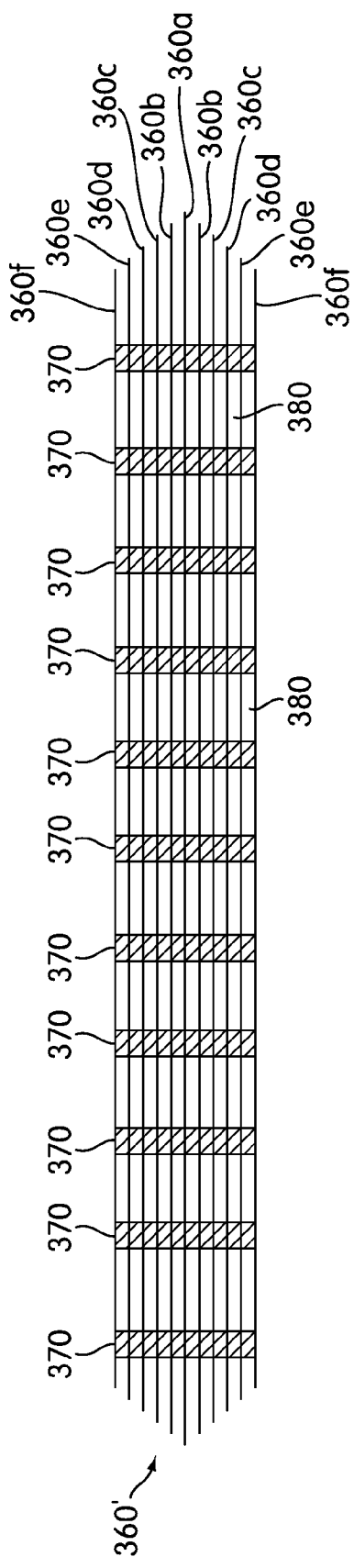
FIG. 7 illustrates a cross sectional view of another embodiment of the fuel electrode of FIG. 5, having a stepped scaffold configuration configured to be shared by opposing oxidant electrodes.

Turning to FIGS. 4-7, the assembly and operation of an embodiment of the electrochemical cells 105 may be appreciated. As shown in FIG. 4, the cell 105 held by cell module 100 may include a fuel electrode 360 positioned in cell chamber 110 so that it is supported by the cell chamber 110 and a plurality of spacers 370 that create flow lanes 380 in the fuel electrode 360. In an embodiment, the fuel electrode 360 is a metal fuel electrode that functions as an anode when the cell 105 operates in discharge, or electricity generating, mode, as discussed in further detail below. In an embodiment, the fuel electrode 360 may comprise a plurality of permeable electrode bodies 360*a*-360*f*, as illustrated in FIG. 6. Each electrode body may include a screen that is made of any formation that is able to capture and retain, through electrodepositing, or otherwise, particles or ions of metal fuel from the ionically conductive medium that flows through the cell module 100.

The plurality of spacers 370, each of which extends across the fuel electrode 360 in a spaced relation to each other, may be connected to the cell chamber 110 so that the fuel electrode 360 may be held in place relative to the cell chamber 110 and to the oxidant electrode (not shown in FIGS. 4-7). The permeable electrode bodies 360*a*-360*f*, as illustrated in FIG. 6, may be separated by sets of the plurality of spacers 370, so that each set of spacers 370 is positioned in between adjacent electrode bodies to electrically isolate the electrode bodies 360*a*-360*f* from each other. Within each set of spacers 370 between adjacent electrode bodies, the spacers 370 are positioned in a spaced relation in a manner that creates the socalled "flow lanes" 380 therebetween. The spacers 370 are non-conductive and electrochemically inert so they are inactive with regard to the electrochemical reactions in the cell 105. The spacers 370 may be made from a suitable plastic material, such as polypropylene, polyethylene, polyester, noryl, ABS, fluoropolymer, epoxy, or so on. The flow lanes 380 are three-dimensional and have a height that is substantially equal to the height of the spacers 370, as illustrated in FIG. 6.

In the illustrated embodiment, the cell chamber 110 has a generally square shape that substantially matches the shape of the fuel electrode 360. One side or end of the cell chamber 110 is connected to the post-disperser channel 190 by the pre-cell manifold 200, which divide the flow of the ionically conductive medium into a plurality of flows through the cell chamber inlets 390. Each cell chamber inlet 390 is substantially aligned with a corresponding flow lane 380, as illustrated in FIG. 5. After the ionically conductive medium has flowed through the flow lanes 380, the ionically conductive medium may exit the cell chamber 110 through the post-cell manifold 210, which has a plurality of cell chamber outlets 400, which are illustrated in FIG. 4.

The permeable bodies 360a-360f and the spacers 370 may be formed as a single unit prior to the first electrode 360 being placed in the cell chamber 110. In other words, the fuel electrode 360 illustrated in FIG. 6 may be formed as a single unit using any suitable manufacturing process. For example, in an embodiment, manufacturing spacers (not shown) that are substantially the size of the desired flow lanes 380 may be placed between adjacent permeable bodies 360a-360f to hold the adjacent permeable electrode bodies 360a-360f in a substantially parallel spaced relation. The manufacturing spacers that are located between the same adjacent permeable electrode bodies are preferably substantially parallel to each other and equally spaced along the electrode bodies 360a-360f, and the manufacturing spacers that are located on opposite sides of the same electrode body are preferably substantially aligned with each other. After the electrode bodies 360a-360f and manufacturing spacers are in place and held together by any suitable means, a suitable material to be used for the spacers 370 may be injected in between the manufacturing spacers and through the permeable electrode bodies 360a-360f. After the material hardens or cures, the manufacturing spacers may be removed from the fuel electrode 360 to create the single electrode scaffold unit 360 illustrated in FIG. 6.

In an embodiment, an injection mold may be fabricated such that the manufacturing spacers are part of the mold. Slots may be formed in the mold to accommodate the permeable electrode bodies 360a-360f, and cavities defining the volumes for the spacers 370 may also be formed. Each of the electrode bodies 360a-360f may be inserted into the mold in a parallel spaced relation to an adjacent body, and the material to be used for the spacers 370 may then be injected into the cavities to form the spacers 370. After the material has cooled in the mold, the first electrode 360 may be ejected from the mold as a single unit containing the permeable electrode bodies 360a-360f and the spacers 370. Of course, any suitable manufacturing method that allows the spacers 370 to be integrally formed on and through the permeable electrode bodies 360a-360f so that the fuel electrode 360 comprising the electrode bodies 360a-360f and the spacers are a single unit may be used. The above-described methods are not intended to be limiting in any way.

Figure 8:
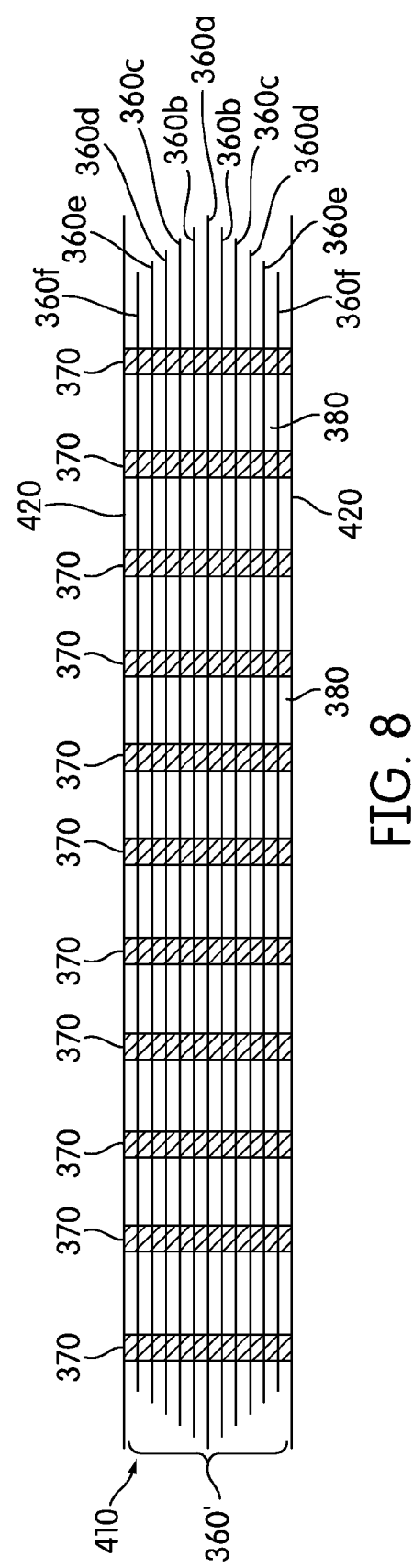
FIG. 8 illustrates a cross sectional view of an embodiment of an electrode assembly including the fuel electrode of FIG. 7, further including separate charging electrodes.

In some embodiments, the permeable electrode bodies 360a-360f may have substantially the same size. In an embodiment, the permeable electrode bodies 360a-360f may have different sizes so that a stepped scaffold configuration may be used, as described by U.S. patent application Ser. No. 13/167,930, incorporated above in its entirety by reference. In an embodiment, a pair of fuel electrodes 360 may be positioned within cell module 105, one associated with frontside plate 280, the other with backside plate 290, each having their own associated oxidant electrode to create a pair of cells 105 housed within cell module 100. In an embodiment, an inert material may be placed between a pair of fuel electrodes 360 to fully separate the pair of cells 105. In another embodiment, such as that shown in FIG. 7, a double-sized fuel electrode 360' may be configured to be positioned in the center of cell chamber 110, and associated with both oxidant electrodes, creating a pair of cells 105 with a common fuel electrode 360, within the cell module 100. As shown, fuel electrode 360' is configured to share a terminal electrode body 360a, while having multiples of electrode bodies 360b-f spaced in opposite directions therefrom by the spacers 370. Also as shown, the embodiment of fuel electrode 360' in FIG. 7 may utilize a stepped scaffold configuration similar to that described in patent application Ser. No. 13/167,930. Shown in FIG. 8 is an embodiment of an electrode assembly 410 that is formed by the combination of fuel electrode 360' and separate charging electrodes 420 spaced from electrode bodies 360f, distal from terminal electrode body 360a. The separate charging electrode 420 will be described in greater detail below. In embodiments of fuel electrode 360 designed to be associated with a single oxidant electrode, the separate charging electrode 420 may simply be the electrode body that is proximal to the oxidant electrode. In other embodiments, there might not be a "separate" charging electrode such as separate charging electrode 420, and the oxidant electrode may be utilized both during charging and discharging of the cell 105 (i.e. as an anode during charging and as a cathode during discharging). In some embodiments, the separate charging electrode 420 may extend at least as far as the longest of the permeable electrode bodies 360a-f, when those electrode bodies 360a-f are in a stepped scaffold configuration, or otherwise vary in size.

Figure 9:
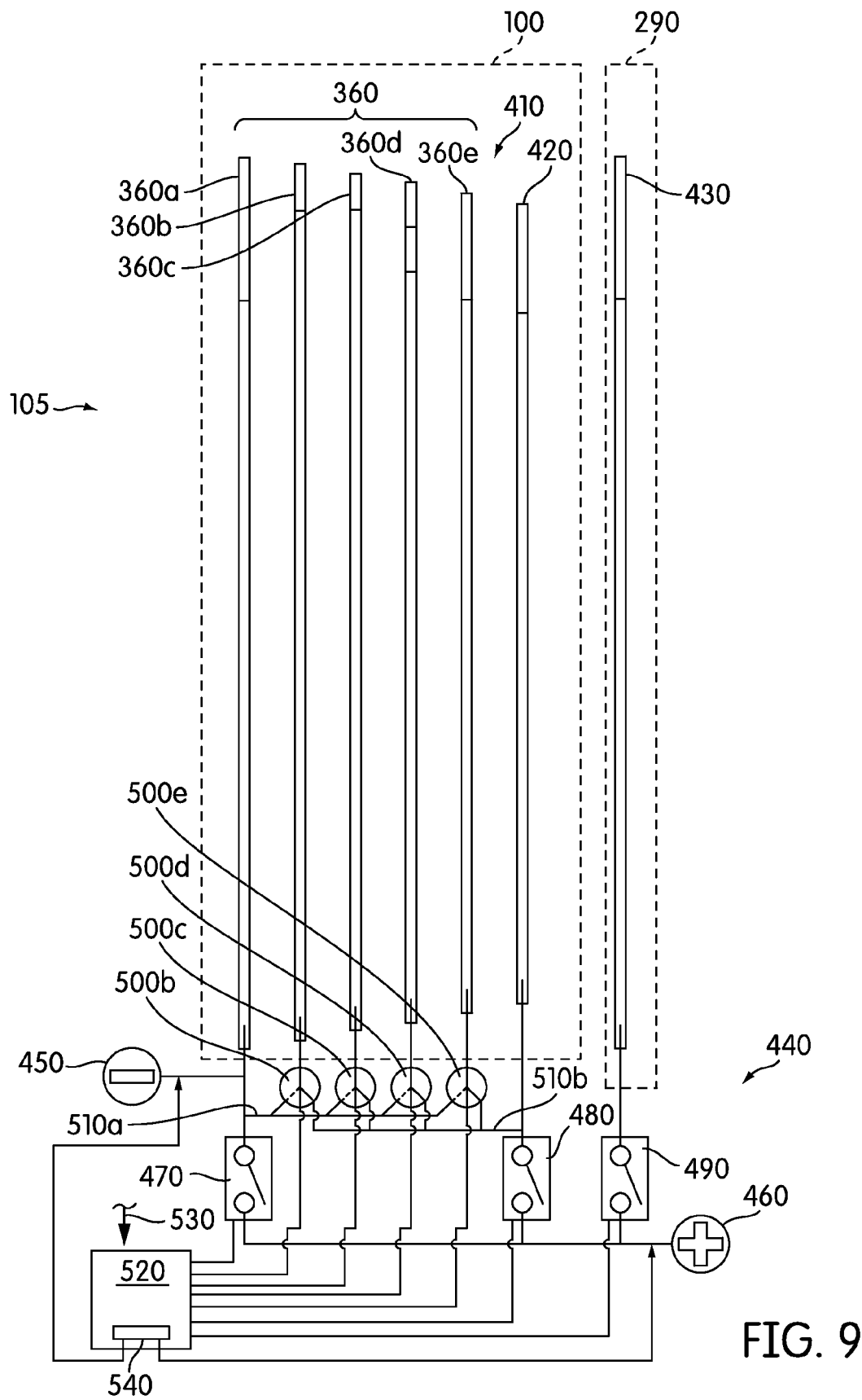
FIG. 9 illustrates a schematic view of an electrode assembly configured to be housed in the cell module, and an oxidant electrode configured to be housed in one of the covering plates, electrically connected via a switching system.

Shown in FIG. 9 is a schematic view of an embodiment of the cell 105. The embodiment of the cell 105 described herein is by way of example only, and is not intended to be limiting in any way. In the embodiment, the cell 105 includes the electrode assembly 410 housed in the cell module 100 (i.e. in the cell chamber 110), and an oxidant electrode 430. As shown, the oxidant electrode 430 is housed in the backside plate 290. In other embodiments the oxidant electrode 430 may be housed in the frontside plate 280, as described above, or both, associated with separate cells 105. As shown, the electrode assembly 410 includes the fuel electrode 360 and a separate charging electrode 420. The fuel electrode 360 of the illustrated embodiment includes one or more of the electrode bodies 360a-e. In an embodiment, the electrode bodies 360a-e may be screens that are made of any formation able to capture and retain, through electrodepositing, or otherwise, particles or ions of metal fuel from the ionically conductive medium that circulates through the cells 105 of the cell assembly 270, as discussed above. Components of the cell 105, including for example, the fuel electrode 360, the permeable electrode bodies 360a-e thereof, the separate charging electrode 420, and the oxidant electrode 430, may be of any suitable construction or configuration, including but not limited to being constructed of Nickel or Nickel alloys (including Nickel-Cobalt, Nickel-Iron, Nickel-Copper (i.e. Monel), or superalloys), Copper or Copper alloys, brass, bronze, or any other suitable metal. In an embodiment, a catalyst film may be applied to some or all of the permeable electrode bodies 360a-e, the separate charging electrode 420 and/or the oxidant electrode 430, and have a high surface material that may be made of some of the materials described above. In an embodiment, the catalyst film may be formed by techniques such as thermal spray, plasma spray, electrodeposition, or any other particle coating method.

The fuel may be a metal, such as iron, zinc, aluminum, magnesium, or lithium. By metal, this term is meant to encompass all elements regarded as metals on the periodic table, including but not limited to alkali metals, alkaline earth metals, lanthanides, actinides, and transition metals, post-transition metals including metalloids, either in atomic, molecular (including metal hydrides), or alloy form when collected on the electrode body. However, the present invention is not intended to be limited to any specific fuel, and others may be used. The fuel may be provided to the cell 105 as particles suspended in the ionically conductive medium. In some embodiments, a metal hydride fuel may be utilized in cell 105.

The ionically conductive medium may be an aqueous solution. Examples of suitable mediums include aqueous solutions comprising sulfuric acid, phosphoric acid, triflic acid, nitric acid, potassium hydroxide, sodium hydroxide, sodium chloride, potassium nitrate, or lithium chloride. The medium may also use a non-aqueous solvent or an ionic liquid. In the non-limiting embodiment described herein, the medium is aqueous potassium hydroxide. In an embodiment, the ionically conductive medium may comprise an electrolyte. For example, a conventional liquid or semi-solid electrolyte solution may be used, or a room temperature ionic liquid may be used, as mentioned in U.S. patent application Ser. No. 12/776,962, the entirety of which is incorporated above by reference. In an embodiment where the electrolyte is semi-solid, porous solid state electrolyte films (i.e. in a loose structure) may be utilized.

The fuel may be oxidized at the fuel electrode 360 when the fuel electrode 360 is operating as an anode, and an oxidizer, such as oxygen, may be reduced at the oxidant electrode 430 when the oxidant electrode 430 is operating as a cathode, which is when the cell 105 is connected to a load L and the cell 105 is in discharge or electricity generation mode, as discussed in further detail below. The reactions that occur during discharge mode may generate by-product precipitates, e.g., a reducible fuel species, in the ionically conductive medium. For example, in embodiments where the fuel is zinc, zinc oxide may be generated as a by-product precipitate/reducible fuel species. The oxidized zinc or other metal may also be supported by, oxidized with or solvated in the electrolyte solution, without forming a precipitate (e.g. zincate may be a dissolved reducible fuel species remaining in the fuel). During a recharge mode, which is discussed in further detail below, the reducible fuel species, e.g., zinc oxide, may be reversibly reduced and deposited as the fuel, e.g., zinc, onto at least a portion of the fuel electrode 360 that functions as a cathode during recharge mode. During recharge mode, either the oxidant electrode 430 or the separate charging electrode 420, and/or another portion of the fuel electrode 360, as described below, functions as the anode.

FIG. 9 shows that the permeable electrode bodies 360*a-e*, the separate charging electrode 420, and the oxidant electrode 430 may be connected by a switching system 440 that may be configured to connect the cell 105 to a power supply PS, a load L, or other cells 105 in series. Such connections may be made through a first terminal 450 and a second terminal 460, wherein the first terminal 450 is negative (cathodic) during charging, and the second terminal 460 is positive (anodic) during recharging. During discharge, the fuel electrode 360 is connected to the load L, and operates as an anode so that electrons given off by the metal fuel, as the fuel is oxidized at the fuel electrode 360, flows to the external load L. The oxidant electrode 430 functions as the cathode during discharge, and is configured to receive electrons from the external load L and reduce an oxidizer that contacts the oxidant electrode 430, specifically oxygen in the air surrounding the cell assembly 270.

The operation of the switching system 440 may vary across embodiments, and in some embodiments the operation of the switching system 440 may be similar to those described in U.S. patent application Ser. No. 13/299,167, incorporated in its entirety by reference above. As another example, in an embodiment, the external load L may be coupled to each of the permeable electrode bodies 360*a*-360*e* in parallel, as described in detail in U.S. patent application Ser. No. 12/385,489, filed on Apr. 9, 2009 and incorporated above by reference in its entirety. In other embodiments, the external load L may only be coupled to a terminal one of the permeable electrode bodies 360*a*-360*e* (i.e. the electrode body 360*a*, distal from the oxidant electrode 430), so that fuel consumption may occur in series from between each of the permeable electrode bodies 360*a*-360*e*.

In the illustrated embodiment of FIG. 9, the switching system 440 includes a bypass switch 470, a charging electrode switch 480, and an oxidant electrode switch 490. The bypass switch 470 is configured to electrically connect the first terminal 450 to the second terminal 460, bypassing the cell 105 for any number of reasons, including but not limited to staggering usage of a plurality of the cells 105, isolating defective cells 105, or so on. The oxidant electrode switch 490 allows connection of the oxidant electrode 430 to the second terminal 460 to create a potential difference between the fuel electrode 360 and the oxidant electrode 430 during discharge of the cell 105. The charging electrode switch 480 is configured to connect at least the charging electrode 420, and potentially some of the fuel electrode 360 (as described in greater detail below) to the second terminal 460, so as to create a potential difference with the remainder of the fuel electrode 360, connected to first terminal 450.

In some non-limiting embodiments, the switches of switching system 440 may be single pole single throw or single pole double throw. They may be of the pivoting, sliding or latching relay type. Also, semiconductor based switches may be used as well. The switches may be activated electrically (electromechanical relay) or magnetically or by other methods known to those familiar in the art. Any other suitable types of switch and switch configurations may be used, and the examples herein are not limiting. In an embodiment, the plurality of switches may be connected in series if the switch has a leakage current in one direction. For example, the body diode of a MOSFET semiconductor based switch will conduct in one direction and the leakage current can be eliminated by placing MOSFET semiconductor based switches facing back to back in series.

As is shown in the illustrated embodiment, a plurality of electrode body switches 500*b-e* are configured to alternatively connect each of electrode bodies 360*b-e* to either a first bus 510*a* associated with electrode body 360*a* (and thus first terminal 450), or a second bus 510*b* associated with the separate charging electrode 420 (and thus second terminal 460 through charging electrode switch 480). In an embodiment, electrode body switches 500*b-e* may be characterized as Single Pole, Double Throw. In some embodiments, electrode body switches 500*b-e* may have three alternative settings, such that each electrode body 360*b-e* may be electrically connected to electrode body 360*a* (and first terminal 450), separate charging electrode 420, or disconnected from both electrode body 360a and separate charging electrode 420. In an embodiment, such electrode body switches 500b-e may be characterized as Single Pole, Triple Throw. As shown, by connecting each of electrode bodies 360b-e to either the first bus 510a or the second bus 510b, each of the permeable electrode bodies 360b-e may either be part of the fuel electrode, or the charging electrode, by being electrically connected to the first terminal 450 or the second terminal 460 respectively.

As shown in the illustrated embodiment, the switches of the switching system 440 may be controlled by a controller 520, which may be of any suitable construction and configuration. In an embodiment, the controller 520 may be configured to manage application of the anodic potential from the power supply PS to permeable electrode bodies 360b-3 and the charging electrode 420. The controller 520 may cause electrodeposition of metal fuel, through reduction of reducible ions of the metal fuel from the ionically conductive medium, to progressively grow from permeable electrode body 360a to each subsequent electrode body 360b-e for application of a cathodic potential to each subsequently connected electrode body 360b-d. The controller 520 may also cause removal of the anodic potential from each subsequently connected electrode body, and may cause application of the anodic potential to at least the subsequent electrode body unconnected by the electrodeposition, or the charging electrode 420 where the last electrode body (i.e. electrode body 360e) has been electrically connected by the electrodeposition to the prior electrode bodies 360a-d. Such application of the anodic potential may be configured to permit or cause oxidization of an oxidizable species of the oxidant.

In an embodiment, the controller 520 may comprise circuitry configured to manipulate the switches of switching system 440 based on an input 530 to determine the proper switch configuration. In some embodiments, the input 530 may be instructions to control the controller 520, external readings or measurements regarding the cell 105 that may influence the operation of the switching system 440, or so on. The controller 520 may also include a microprocessor for executing more complex decisions, as an option. In some embodiments, the controller 520 may also function to manage connectivity between the load L and the power source PS and the first and Nth cells. In some embodiments, the controller 520 may include appropriate logic or circuitry for actuating the appropriate bypass switches 470 in response to detecting a voltage reaching a predetermined threshold (such as drop below a predetermined threshold).

In some embodiments, the controller 520 may further comprise or be associated with a sensing device 540, including but not limited to a voltmeter (digital or analog) or potentiometer or other voltage measuring device or devices, that can be used to determine when to modify the configuration of the plurality of switches, such as to maintain the proximity of the anode and the cathode as fuel growth progresses during charging. In some embodiments, the sensing device 540 may instead measure current, resistance, or any other electrical or physical property across or of the cell 105 that may be used to determine when to modify the configuration of the plurality of switches. For example, the sensing device 540 may measure a spike in current or a drop in potential difference between two electrode bodies. In some embodiments, the controller 520 may control the switches of the switching system 440 based on the passage of increments of time. For example, in an embodiment the time for fuel growth to progress between adjacent electrode bodies may be known, and used to calculate when to operate the switching system 440 so as to progressively rewire the electrodes to maintain an adjacent separation between the anode and the cathode, or provide for parallel versus progressive charging, as is described in greater detail in U.S. patent application Ser. Nos. 13/230,549 and 13/299,167, incorporated above by reference in their entireties. In an embodiment, the controller 520 may control the switches of switching system 440 to provide a high efficiency mode for the cell, such as is disclosed in U.S. patent application Ser. No. 13/083,929, incorporated in its entirety above by reference.

In an embodiment, the controller 520 may be configured to control the bypass switch 470 to bypass the cell 105. In various embodiments, the bypass switch 470 may be closed for any number of reasons, including based on readings regarding the cell made by sensing device 540, or based on external commands fed into the controller 520 via the input 530. In an embodiment, the controller 520 may coordinate with other controllers 520 associated with other cells 105, and may programmatically control the other controllers 520 to network control of the cells 105. In an embodiment, a master controller may be provided to control a plurality of the controllers 520, providing the ability to control the operation of the switching system 440 for a plurality of cells 105. In an embodiment, the controller 520 may implement an algorithm, such as but not limited to one similar to those disclosed in U.S. patent application Ser. No. 13/299,167, or implement other computer or programmatic control for the switching system 440.

Figure 10:
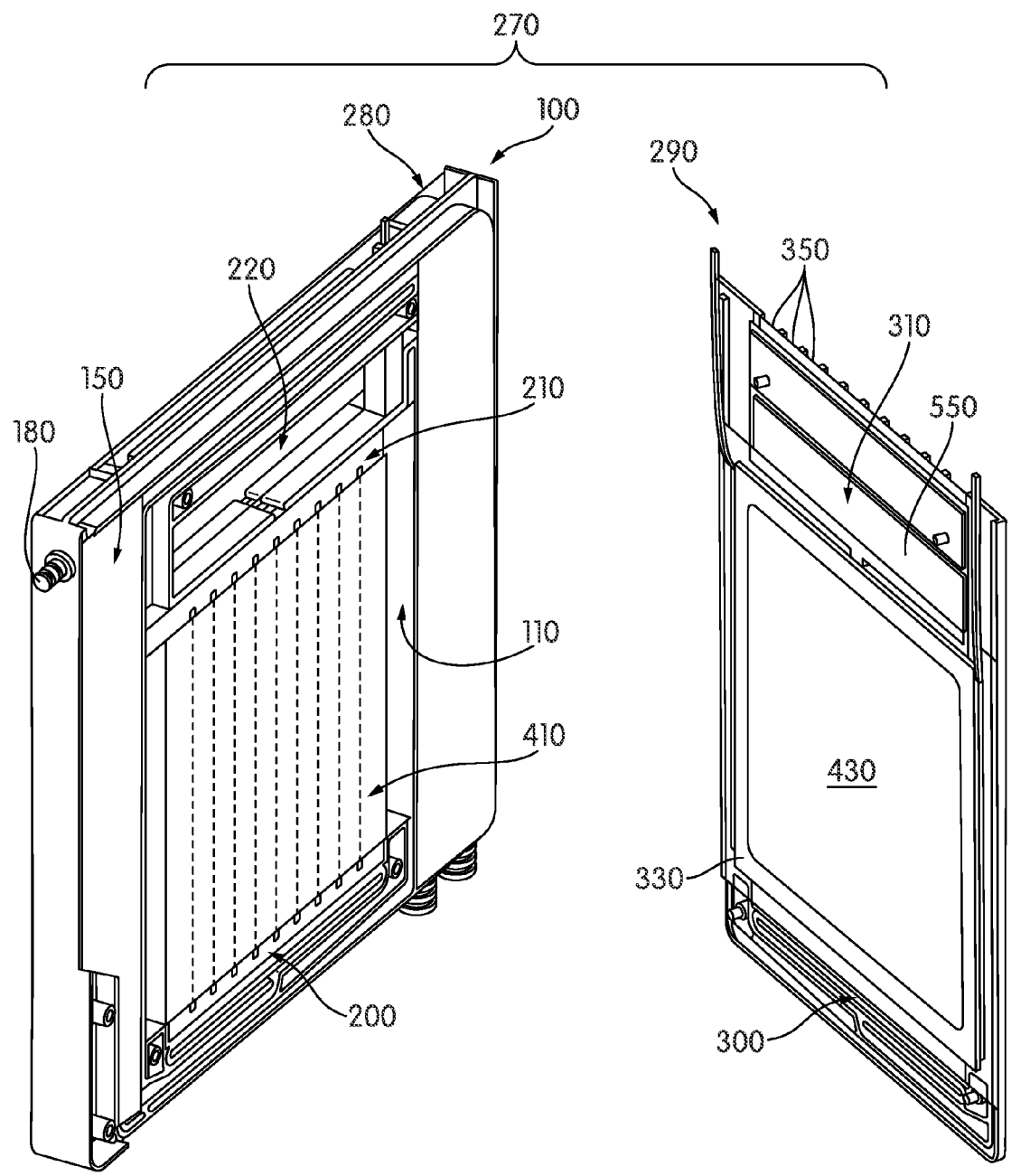
FIG. 10 illustrates an embodiment of the cell assembly of FIG. 2 with the backside plate cover removed to show the oxidant electrode and the electrode assembly of FIG. 9 housed therein.

As indicated above, in an embodiment the oxidant electrode 430 may be assembled into and supported by the frontside plate 280 and/or the backside plate 290. FIG. 10 depicts the rear side of the cell module 100 housing the electrode assembly 410 of a cell 105 in the cell chamber 110. The electrode assembly 410 may be positioned such that the separate charging electrode 420 is spaced proximal to the side of cell module 100 that will couple with the backside plate 290. In an embodiment, another electrode assembly associated with the frontside plate 280 may be positioned on the obscured side of cell module 100. The backside plate 290, which is configured to be received by the cell module 100, contains the oxidant electrode 430 therein, which would form the sidewall of the cell chamber 110, and may form a seal or may otherwise be sealed between the cell chamber 110 and the backside plate 290, so that the ionically conductive medium flowing through the cell module 100 is confined as it flows through the cell chamber 110.

The oxidant electrode 430 may therefore be liquid impermeable, yet air permeable, such that air may enter the cell 105 to serve as the oxidant during the electrochemical reactions taking place during discharge of the cell 105, between the oxidant electrode 430 and the fuel electrode 360. In an embodiment, the oxidant enters the cell 105 by reaching the oxidant electrode 430 through the air apertures 340 in the backwall 320 described above, which are obscured by the oxidant electrode 430 in FIG. 10. In an embodiment, the oxidant electrode 430 may be glued into the backside plate 290 such that a vent layer remains between the backwall 320 and the oxidant electrode 430. In an embodiment, the oxidant electrode 430 may be a metal-air breathing cathode. In an embodiment, oxidant electrode 430 may comprise a catalyst, a current collector, and a hydrophobic membrane. In an embodiment, those elements of the oxidant electrode 430 that provide for oxygen reduction in the electrochemical cell 105, including the electrode meshes or coatings used to create a potential difference between the fuel electrode 360 and the oxidant electrode 430 when the cell 105 is connected to the load L, may be characterized as the "active material(s)" of the oxidant electrode 430. In some embodiments, the oxidant electrode 430 may be formed by a mixture of catalyst particles or materials, conductive matrix and hydrophobic materials sintered to form a composite material or otherwise layered together. In an embodiment, the surface of the oxidant electrode 430 exposed to the ionically conductive medium may be more hydrophilic compared to the surface exposed to an oxidizer.

It may be appreciated that during the charging and/or the discharging of the cell 105, gasses may be evolved during the electrochemical reactions. For example, during charging of the cell 105, where the ionically conductive medium contains reducible zinc ions that are to be plated as zinc fuel on the fuel electrode 360, the electrochemical reactions occurring are reduction-oxidation (redox) reactions. The reduction reaction takes place at the fuel electrode 360 (the reduction site), and may conform to $ZnO+H_2O+2e^- \rightarrow Zn+2OH^-$. The corresponding oxidation reaction occurs at the charging electrode (i.e. the separate charging electrode 420), and may conform to $2OH^- \rightarrow 2e^- + \frac{1}{2}O_2 + H_2O$. The charging electrode (which may be characterized as an oxygen evolving electrode) is therefore understood to be producing oxygen gas within the cell 105. The local site of the evolution of the oxygen in the cell 105 may vary, depending on which of the electrode bodies 360*b-e* are associated with the terminal electrode body 360*a*, and which are associated with the separate charging electrode 420, based on the configuration of the switching system 440. In other embodiments, such as where different metal fuels are utilized, other reactions may occur, which may also evolve oxygen in the cell.

In some embodiments hydrogen may evolve within the cell 105, or elsewhere in the cell module 100. For example, in some embodiments, the cell module 100 may utilize catch trays, such as those described in U.S. patent application Ser. No. 13/185,658, which may be strategically positioned to receive particles of zinc that may separate from the fuel electrode 360. For example, such catch trays may be positioned near or in the pre-cell manifold 200, so that dendrites or other elements of fuel growth that break away from the fuel electrode 360 fall downwards against the flow, and contact the catch tray. In some embodiments, the catch tray may comprise a catalyst configured to oxidize the fuel locally at the catch tray, so that the separated fuel particles do not clog up or otherwise impede cell performance or the flow of the ionically conductive medium. For example, where the metal fuel is zinc, the oxidation may correspond to the equation $Zn \rightarrow Zn^{2+} + 2e^-$. The zinc ions may bond with hydroxide ions that are found in the ionically conductive medium from the other electrochemical processes in the cell, such that $Zn^{2+} + 4(OH^-) \rightarrow Zn(OH)_4^{2-}$, which would flow in the ionically conductive medium, and be free to be reduced as zinc fuel at the fuel electrode 360 during a future charging of the cell 105. The free electrons from the oxidation of the zinc, however, may combine with hydrogen ions in the ionically conductive medium from other electrochemical reactions in the cell, such that $H^+ + 2e^- \rightarrow H_2$, evolving hydrogen gas within the cell. Although such hydrogen gas would generally be in a much smaller quantity than the evolved oxygen, it too may be present within the cell module 100.

In some embodiments, air intended to remain inside the inlet disperser chamber 150 (i.e. that is let into the cell module 100 by air inlet 180) may migrate out of the disperser chamber 150, into the cell chamber 110. The presence of gasses such as the air from the disperser chamber 150, evolved oxygen and hydrogen from various electrochemical reactions within the cell 105 or the catch tray, or any other gas that enters into or is generated within the cell module 100 may impede the performance of the cell 105, and/or the flow of the ionically conductive medium in the flow path. Depending on the nature of the gas or combination of gasses, potentially volatile mixes may arise, which may be harmful to the cell assembly 270, the overall system, or the surrounding environment.

As depicted in the embodiment of FIG. 10, the post-cell chamber backwall space 310 that is located on the backside plate 290 may comprise a gas vent 550 configured to permit the release of gasses (including but not limited to those described above) from the cell module 100. The gas vent 550 may be of any suitable construction or configuration that is capable of releasing the gasses within the cell module 100 while constraining the ionically conductive medium within the flow path by preventing permeation of the ionically conductive medium therethrough. In other words, the gas vent 550 may be air permeable, but liquid impermeable. For example, in an embodiment the gas vent 550 may be a hydrophobic membrane that is sealed to one or more apertures within the post-cell chamber backwall space 310. In an embodiment, the gas vent 550 may be sealed to a portion of the backside plate 290, so that the entirety of the post-cell chamber backwall space 310 is the gas vent 550. In various embodiments, the gas vent 550 may be glued, fused, or otherwise molded onto or into the post-cell chamber backwall space 310 or the backside plate 290. In an embodiment, the aperture or apertures in the post-cell chamber backwall space 310 contacting the gas vent 550, or the gas vent 550 on the backside plate 290 itself, may lead to the air channels 350, such that the gasses may diffuse with the outside air. In some embodiments, the air channels 350 may extend from the top to the bottom of backside plate 290, or may otherwise continue past the air apertures 340 in the backwall 320, so that gasses which vent outside the cell assembly 270 may disperse in the surrounding environment of the cell assembly 270 by either rising or falling depending on the buoyancy of the gas as compared to the surrounding air.

In an embodiment, the gas vent 550 may comprise polytetrafluoroethylene (also known as PTFE, or Teflon®), which may in some embodiments be thermo-mechanically expanded (also known as ePTFE, or Gore-Text®). In some embodiments, the gas vent 550 may further comprise one or more re-enforcing layers configured to provide structural support or additional protection for the PTFE material. In an embodiment, the reinforcing layers may be configured to prevent excessive deformation of the PTFE from the fluid pressure of the ionically conductive medium. For example, in some embodiments the reinforcing layer may include a composite material formed by pressurization and sintering of a mixture of hydrophobic material (such as PTFE), particles with high mechanical strength (such as carbon), and/or other appropriate binders.

In some embodiments, the gas vent 550 may be formed from or otherwise include other fluoropolymer materials. In an embodiment, the gas vent 550 may comprise polyurethane. In other embodiments, the gas vent 550 may comprise or be formed of other materials having hydrophobic properties. For example, in some embodiments, the gas vent 550 may comprise a fabric coated with a durable water repellant, or other repellant coating to repel the ionically conductive medium. In various embodiments, the gas vent 550 may comprise a porous material, wherein each of the pores are significantly smaller than the size of a droplet of the ionically conductive medium, to make the fabric liquid impermeable. In an embodiment, the gas vent 550 may be of sufficient strength to contain the ionically conductive medium within the flow path or other area within the housing or electrochemical cell, and maintain the pressure head such that the ionically conductive medium continues to flow, without rupturing the gas vent 550, or otherwise losing the flow pressure.

Figure 11:
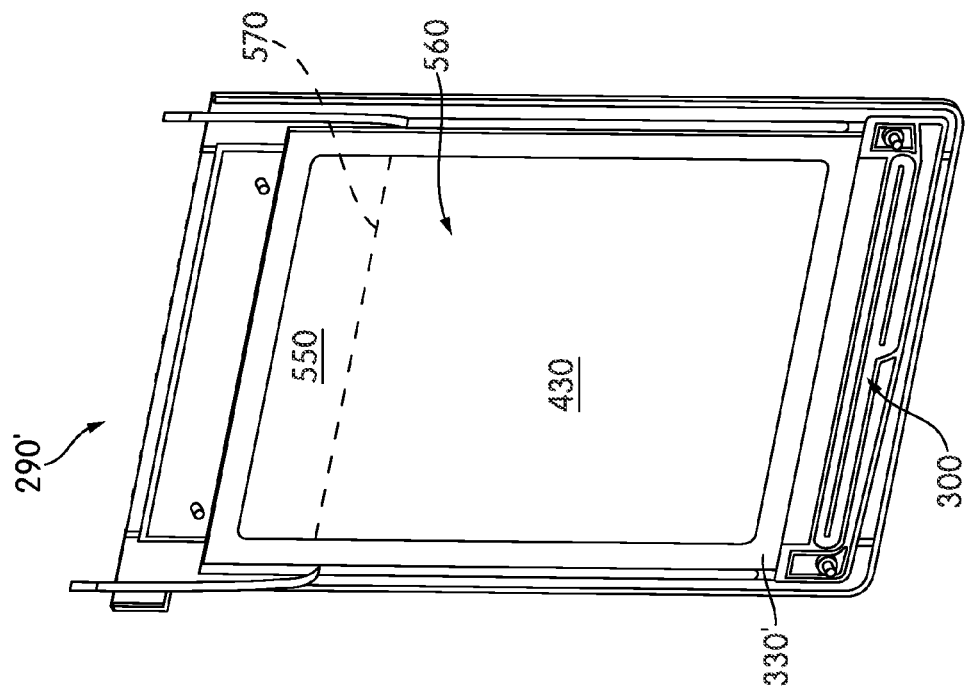
FIG. 11 illustrates another embodiment of the cell assembly of FIG. 2, with where the backside cover contains a gas vent that is integrated into the oxidant electrode as an oxidant electrode and vent assembly.
Figure 11:
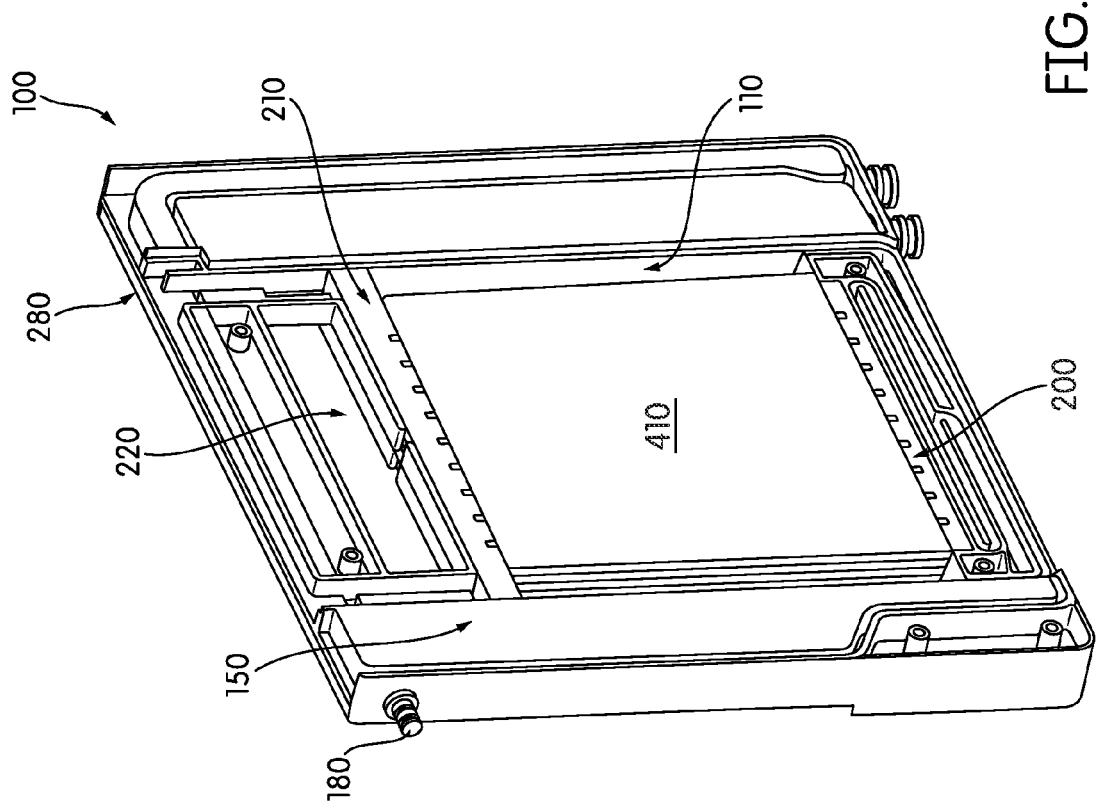

Depicted in FIG. 11 is an embodiment of cell module 100, which may be configured to engage another embodiment of the backside plate 290 (depicted as backside plate 290'). As shown, backside plate 290' may be configured to include an extended lip 330', so as to correspond to an area of cell module 100 that generally includes both cell chamber 110 and post-cell chamber 220, wherein a combined gas vent with oxidant electrode assembly 560, that is generally air-permeable but liquid impermeable, may be sealed to the extended lip 330' to facilitate air-permeability into and/or out of the cell chamber 110 and the post-cell chamber 220, while generally preventing loss of the ionically conductive medium therethrough. As shown in FIG. 11, a dividing line 570 on the combined gas vent with oxidant electrode assembly 560 may be utilized to demarcate the oxidant electrode 430 from the gas vent 550. In various embodiments, the dividing line 570 may correspond to a location that would be aligned between the cell chamber 110 and the post-cell chamber 220 when the backside plate 290' is assembled onto the cell module 100. For example, in an embodiment, the dividing line 570 may generally align to the top of the electrode assembly 410, near the bottom of the post-cell manifold 210. In other embodiments, the dividing line 570 may generally align to the top of the post-cell manifold 210, near the bottom of the post-cell chamber 220. Regardless of the actual demarcation between the gas vent 550 and the oxidant electrode 430 on the combined gas vent with oxidant electrode assembly 560, in some embodiments the gas vent 550 may generally align to the post-cell chamber 220, while the oxidant electrode 430 may generally align to the electrode assembly 410 in the cell chamber 110. In some embodiments, sealants, including but not limited to those described above, may be positioned across the dividing line 570, which may further assist in flowing the ionically conductive medium through the post-cell manifold 210, as described above.

Figure 12:
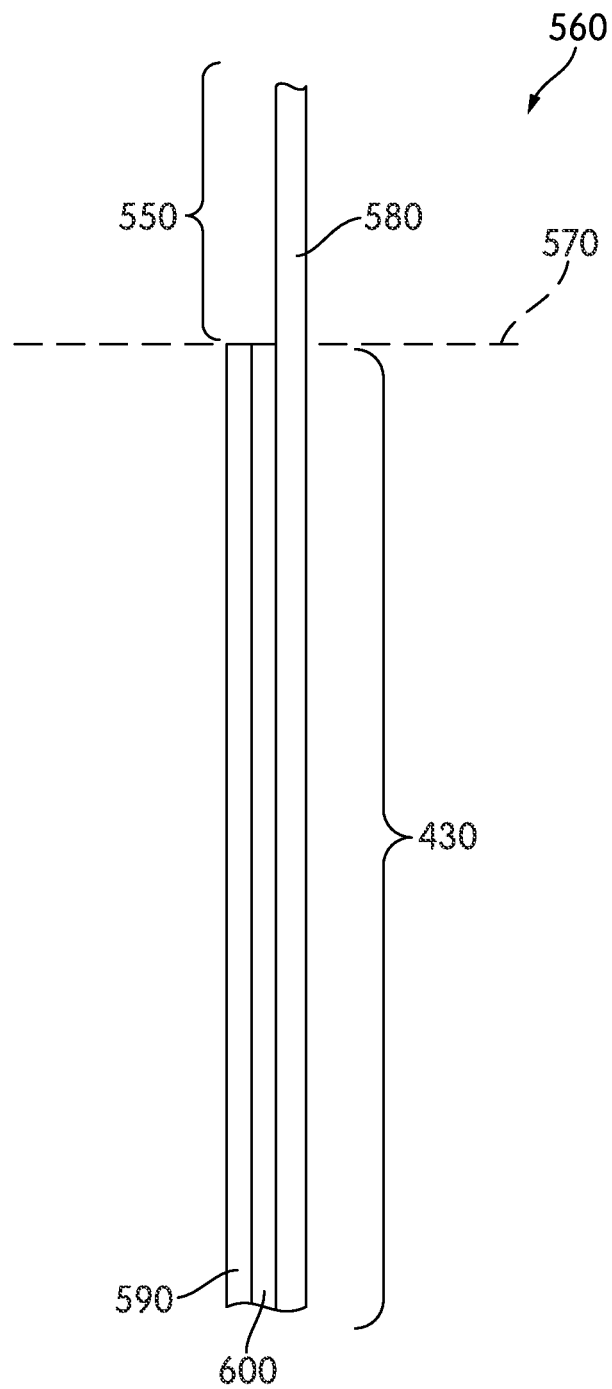
FIG. 12 illustrates a schematic side view of an embodiment of the oxidant electrode and vent assembly of FIG. 18.

Shown in FIG. 12 is a non-limiting schematic cross-sectional view of a portion of the combined gas vent with oxidant electrode assembly 560 depicted above, near the dividing line 570. As shown, in an embodiment, the gas vent 550 and the oxidant electrode 430 may both include a shared piece of air-permeable but liquid impermeable material 580, which in some embodiments may comprise materials similar to those described as being used for gas vent 550 above. As shown, the portion of the air-permeable but liquid-impermeable material 580 that is associated with the oxidant electrode 430 is utilized as a backing material to support the active materials that are used to create the potential difference with the fuel electrode 360 when the cell 105 is connected to the load L, while the portion of the air-permeable but liquid impermeable material 580 that is associated with the gas vent 550 lacks those active materials.

As an example, in the illustrated embodiment, a conductive layer 590 and a catalyzed active layer 600 are provided on the portion of the air-permeable but liquid-impermeable material 580 that is associated with the oxidant electrode 430, and may form layers thereon, as generally illustrated. In other embodiments, the conductive layer 590 and the catalyzed active layer 600 may be sintered into or otherwise combined with each other and/or the air-permeable but liquid impermeable material 580. As such, although described and illustrated as layers in the grossly simplified view of FIG. 12, the constituent members of the oxidant electrode 430 may in some embodiments be at least a partially combined and intermingled together. As above, in various embodiments the conductive layer 590 and/or the catalyzed active layer 600 may be of any suitable construction or configuration, including but not limited to being constructed of Nickel or Nickel alloys (including Nickel-Cobalt, Nickel-Iron, Nickel-Copper (i.e. Monel), or superalloys), Copper or Copper alloys, brass, bronze, carbon, platinum, silver, silver-palladium, or any other suitable metal or alloy. In some embodiments the conductive layer 590 may comprise a current collecting screen, while the catalyzed active layer 600 may include a catalyst film, which in various embodiments may be formed by techniques including but not limited to thermal spray, plasma spray, electrodeposition, or any other particle coating method.

While in the illustrated embodiments of FIGS. 10-12 the gas vent 550 is of an air-permeable yet liquid impermeable material configuration, in other embodiments the gas vent 550 may be of any other appropriate configuration. For example, in some embodiments the gas vent 550 may be a pressure release nozzle configured to release gasses once a threshold pressure is reached. In such an embodiment, a gas pocket may be maintained at the top of the cell assembly 270, along the flow path, where the pressure release nozzle configuration of the gas vent 550 may be configured to open to prevent an excessive buildup of gas in the pocket. In some embodiments, multiple configurations of the gas vent 550 may be utilized in tandem in the cell assembly 270.

Although in the illustrated embodiments, the gas vent 550 is positioned to be on the rear sidewall for the post-cell chamber 220 (i.e. located on or replacing the post-cell chamber backwall space 310), in other embodiments, the gas vent 550 may be located elsewhere along the flow path of cell module 100. For example, instead of venting gasses through a portion of backside plate 290, the gas vent 550 may be associated with frontside plate 280, and may vent gasses through an aperture or apertures associated with a front sidewall for the post-cell chamber 220. In an embodiment, a portion of post-cell manifold 210 may comprise the gas vent 550, or a portion of the frontside plate 280 or backside plate 290 corresponding to post-cell manifold 210 may comprise the gas vent 550. Likewise, a top portion of the post-cell chamber 220 may comprise the gas vent 550, such that the gasses are vented above cell module 100, and not through the frontside plate 280 or the backside plate 290. In some embodiments, multiple gas vents 550 may be positioned along the flow path of the ionically conductive medium, to strategically release gasses that are formed within the cells 105. For example, both the frontside plate 280 and the backside plate 290 may comprise gas vents 550 to release the gasses from the cell module 100. Generally the gas vents 550 will be downstream in the flow path from the cells 105 in the cell chamber 110, so that gasses evolved during the charging or discharging of the cells 105 will travel with the flow of the ionically conductive medium until being discharged, although in an embodiment the gas vent 550 may be located alongside or below the cells 105, depending on the configuration of the cells 105 and/or the cell module 100. In an embodiment, the gas vent 550 may be integrated into some of the seals or gaskets that prevent the ionically conductive medium from inadvertently leaving the cell module 100. For example, in an embodiment, the gas vent 550, or one of a plurality of gas vents 550, may be positioned where the wires or other conductors that are connected to the electrodes of the electrode assembly 410 and/or the oxidant electrode 430 exit the cell module 100, so that gas may additionally escape at that location, while providing a barrier to prevent leakage of the ionically conductive medium.

It should be understood that other mechanisms for limiting or suppressing unwanted gasses may be utilized in addition to gas vent 550. For example, to limit or suppress hydrogen evolution at the fuel electrode 360, which in some cases may occur during the discharge mode or during quiescent (open circuit) periods of time, salts may be added to retard hydrogen evolving reactions. Salts of stannous, lead, copper, mercury, indium, bismuth, or any other material having a high hydrogen overpotential may be used. In addition, salts of tartrate, phosphate, citrate, succinate, ammonium or other hydrogen evolution suppressing additives may be added. In an embodiment, metal fuel alloys, such as Al/Mg may be used to suppress hydrogen evolution. Additionally, other additives may also or alternatively be added to the ionically conductive medium, including, but not limited to additives which enhance the electrodeposition process of the metal fuel on the fuel electrode 360, such as is described in U.S. patent application Ser. No. 13/028,496, incorporated in its entirety by reference above. Such additives may reduce the loose dendritic growth of fuel particles, and thus the likelihood of such fuel particles separating from the fuel electrode 360, which may reduce hydrogen evolution at the catch trays configured to receive such particles, for example.

The embodiments of the cells 105 should not be considered to be limiting in any way and are provided as non-limiting examples of how the cell 105 may be charged or discharged. U.S. patent application Ser. No. 12/885,268, filed on Sep. 17, 2010, the entire content of which is incorporated above by reference, describes embodiments of a rechargeable electrochemical cell system with charge/discharge mode switching in the cells. As also noted above, the fluid connections between multiple cells 105 in the cell assemblies 270 may vary. Additional details of embodiments of cells 105 that are connected in series are provided in U.S. patent application Ser. No. 12/631,484, filed Dec. 4, 2009 and incorporated above by reference in its entirety. Although some of the cell assemblies 270 described above have two cells 105 enclosed therein, creating a bicell, the present invention may be practiced with additional cells 105 stacked and fluidly connected to the illustrated cells 105 of the cell assembly 270, creating tricells, quadcells, or so on. Additionally, as indicated above, in some embodiments the ionically conductive medium might be generally stationary within the cell module 100, and might not flow. Alternative and additional mechanisms to increase ionic resistance between fluidly connected cells may be utilized in the present invention, such as those discussed in U.S. patent application Ser. No. 12/631,484, incorporated by reference above.

The foregoing illustrated embodiments have been provided solely for illustrating the structural and functional principles of the present invention and are not intended to be limiting. For example, the present invention may be practiced using different fuels, different oxidizers, different electrolytes, and/or different overall structural configuration or materials. Again, in some embodiments the configuration of the cell 105 may be similar to those disclosed in the U.S. patent applications incorporated by reference above. Thus, the present invention is intended to encompass all modifications, substitutions, alterations, and equivalents within the spirit and scope of the following appended claims.

What is claimed is:

1. An electrochemical cell system comprising:
    one or more electrochemical cells, each comprising:
        (i) a fuel electrode comprising a metal fuel; and
        (ii) an oxidant electrode spaced from the fuel electrode comprising active material;
    a liquid ionically conductive medium for conducting ions between the fuel and oxidant electrodes to support electrochemical reactions at the fuel and oxidant electrodes;
    a housing configured to contain the ionically conductive medium in the one or more electrochemical cells;
    a gas permeable and liquid impermeable membrane positioned along a portion of the housing and configured to close the portion of the housing to contain the ionically conductive medium therein, the gas permeable and liquid impermeable membrane having an inner surface facing the ionically conductive medium wherein the inner surface comprises a first portion and a second portion; wherein the first portion of the gas permeable and liquid impermeable membrane does not have the oxidant electrode active material and provides a vent for the cell to permit gas in the housing to permeate therethrough for venting of the gas from the one or more electrochemical cells and the second portion of the gas permeable and liquid impermeable membrane has the oxidant electrode active material to comprise the oxidant electrode; and
    wherein the fuel electrode and the oxidant electrode are configured to, during discharge, oxidize the metal fuel at the fuel electrode and reduce an oxidant at the oxidant electrode to generate a discharge potential difference therebetween for application to a load.

2. The electrochemical cell system of claim 1, wherein the gas permeable and liquid impermeable membrane comprises a fluoropolymer material.

3. The electrochemical cell system of claim 2, wherein the fluoropolymer material comprises polytetrafluoroethylene.

4. The electrochemical cell system of claim 1, wherein the liquid ionically conductive medium is configured to flow in a flow path through and among the one or more electrochemical cells.

5. The electrochemical cell system of claim 4, wherein the gas permeable and liquid impermeable membrane is positioned downstream along the flow path from the fuel electrode and the oxidant electrode, and configured to vent by permeation gases generated during electrochemical reactions at the fuel and oxidant electrodes.

6. The electrochemical cell system of claim 4, wherein the gas permeable and liquid impermeable membrane is configured to contact the ionically conductive medium while it flows through the flow path.

7. The electrochemical cell system of claim 5, wherein the housing comprises a cell module configured to receive the fuel electrode, and at least one sidewall configured to receive the oxidant electrode and the gas permeable and liquid impermeable membrane, wherein the at least one sidewall is assembled onto the cell module to constrain the ionically conductive medium to the flow path.

8. The electrochemical cell system of claim 1, wherein each electrochemical cell further comprises a charging electrode selected from the group consisting of (a) the oxidant electrode, (b) a separate charging electrode spaced from the fuel and oxidant electrodes, and (c) a portion of the fuel electrode.

9. The electrochemical cell system of claim 8, wherein the fuel electrode and the charging electrode are configured to, during re-charge, reduce a reducible species of the metal fuel to electrodeposit the metal fuel on the fuel electrode and oxidize an oxidizable species of the oxidant by application of a re-charge potential difference therebetween from a power source.

10. The electrochemical cell system of claim 9, wherein the fuel electrode comprises a series of permeable electrode bodies arranged in spaced apart relation;
    wherein the spaced apart relation of the permeable electrode bodies enables the re-charge potential difference to be applied between the charging electrode and at least one of the permeable electrode bodies, with the charging electrode functioning as the anode and the at least one permeable electrode body functioning as the cathode, such that the reducible fuel species are reduced and electrodeposited as the metal fuel in oxidizable form on the at least one permeable electrode body, whereby the electrodeposition causes growth of the metal fuel among the permeable electrode bodies such that the electrodeposited metal fuel establishes an electrical connection between the permeable electrode bodies.

11. The electrochemical cell system of claim 9, wherein the reducible species of the metal fuel comprises ions of zinc, iron, aluminum, magnesium, or lithium, and wherein the metal fuel is zinc, iron, aluminum, magnesium, or lithium.

12. The electrochemical cell system of claim 1, wherein the ionically conductive medium comprises an aqueous electrolyte solution.

13. The electrochemical cell system of claim 12, wherein the aqueous electrolyte solution comprises sulfuric acid, phosphoric acid, triflic acid, nitric acid, potassium hydroxide, sodium hydroxide, sodium chloride, potassium nitrate, or lithium chloride.

14. The electrochemical cell system of claim 1, wherein each electrochemical cell has an associated said housing.

15. An electrochemical cell system comprising:
a housing;
one or more electrochemical cells positioned within the housing, each comprising:
  (i) a fuel electrode comprising a metal fuel; and
  (ii) an oxidant electrode spaced from the fuel electrode comprising active material;
a gas permeable and liquid impermeable membrane positioned to define a portion of a surface of the housing, wherein the gas permeable and liquid impermeable membrane comprises an inner surface having a first portion and a second portion;
a liquid ionically conductive medium, within the housing, for conducting ions between the fuel and oxidant electrodes to support electrochemical reactions at the fuel and oxidant electrodes;
wherein the fuel electrode and the oxidant electrode are configured to, during discharge, oxidize the metal fuel at the fuel electrode and reduce an oxidant at the oxidant electrode to generate a discharge potential difference therebetween for application to a load;
wherein the gas permeable and liquid impermeable membrane is configured to prevent permeation of the ionically conductive medium out of the housing, the inner surface facing the ionically conductive medium, and wherein the first portion of the inner surface of the gas permeable and liquid impermeable membrane does not have the oxidant electrode active material and provides a vent for the cell to permit gas in the housing to permeate therethrough for venting of the gas from the one or more electrochemical cells, and the second portion of the gas permeable and liquid impermeable membrane has the oxidant electrode active material to comprise the oxidant electrode.

* * * * *